US012596957B2

(12) United States Patent
Zou et al.

(10) Patent No.: US 12,596,957 B2
(45) Date of Patent: Apr. 7, 2026

(54) BIAS DETECTION AND REDUCTION IN MACHINE-LEARNING TECHNIQUES

(71) Applicant: EQUIFAX INC., Atlanta, GA (US)

(72) Inventors: Mufeng Zou, Melbourne (AU); Swathi Veeravelly, Melbourne (AU); Marcus Bruhn, Melbourne (AU)

(73) Assignee: EQUIFAX, INC., Atlanta, GA (US)

( * ) Notice: Subject to any disclaimer, the term of this patent is extended or adjusted under 35 U.S.C. 154(b) by 749 days.

(21) Appl. No.: 18/046,661

(22) Filed: Oct. 14, 2022

(65) Prior Publication Data

US 2023/0121564 A1     Apr. 20, 2023

Related U.S. Application Data

(60) Provisional application No. 63/262,616, filed on Oct. 15, 2021.

(51) Int. Cl.
*G06N 20/00* (2019.01)
*G06F 18/21* (2023.01)
(Continued)

(52) U.S. Cl.
CPC ......... *G06N 20/00* (2019.01); *G06F 18/2155* (2023.01); *G06F 18/217* (2023.01);
(Continued)

(58) Field of Classification Search
CPC .......... G06N 20/00; G06N 20/10; G06N 5/04; G06N 5/01; G06N 3/098; G06N 3/088;
(Continued)

(56) References Cited

U.S. PATENT DOCUMENTS 9,336,494 B1 * 5/2016 Purpura ................. G06N 20/00
11,200,511 B1 * 12/2021 London .................... G06N 7/01
(Continued)

FOREIGN PATENT DOCUMENTS

WO     WO 2012151198 A1 * 11/2012
WO     WO 2018013148 A1 *  1/2018
WO     WO 2019/032156 A1 *  2/2019

OTHER PUBLICATIONS

Ashwathy Ashokan et al., "Fairness metrics and bias mitigation strategies for rating predictions", Information Processing & Management, vol. 58, Issue 5, Sep. 2021, 102646, pp. 1-18.*
(Continued)

*Primary Examiner* — Srirama Channavajjala
(74) *Attorney, Agent, or Firm* — Kilpatrick Townsend & Stockton LLP

(57) ABSTRACT

In some aspects, a computing system can improve a machine learning model for risk assessment by removing or reducing bias in the machine learning model. The training process for the machine learning model can include training the machine learning model using training samples, obtaining data for a protected attribute, and calculating a bias metric using the data for the protected attribute and data obtained from the trained machine learning model. Based on the bias metric, bias associated with the machine learning model can be detected. The machine learning model can be modified based on the detected bias and re-trained. The re-trained machine learning model can be used to predict a risk indicator for a target entity. The predicted risk indicator can be transmitted to a remote computing device and be used for controlling access of the target entity to one or more interactive computing environments.

20 Claims, 4 Drawing Sheets

(51) Int. Cl.

| | |
|---|---|
| *G06F 18/214* | (2023.01) |
| *G06F 40/44* | (2020.01) |
| *G06N 3/00* | (2023.01) |
| *G06N 3/088* | (2023.01) |
| *G06N 3/098* | (2023.01) |
| *G06N 20/10* | (2019.01) |
| *H04L 9/40* | (2022.01) |

(52) U.S. Cl.
CPC ............. *G06F 40/44* (2020.01); *G06N 3/088* (2013.01); *G06N 3/098* (2023.01); *G06N 20/10* (2019.01); *H04L 63/10* (2013.01)

(58) Field of Classification Search
CPC ........ G06N 3/0454–0455; H04L 63/10; G06F 40/44; G06F 18/2155; G06F 18/2113; G06F 18/217; G06Q 10/0635
See application file for complete search history.

(56) References Cited

U.S. PATENT DOCUMENTS

| | | | | |
|---|---|---|---|---|
| 11,507,836 | B1 * | 11/2022 | Kurz .................... | G06N 3/0455 |
| 2019/0235481 | A1 * | 8/2019 | Takigawa ............. | G05B 23/024 |
| 2020/0279334 | A1 * | 9/2020 | Billings ................ | G06Q 40/08 |
| 2021/0004589 | A1 * | 1/2021 | Turkelson ........... | G06V 10/809 |
| 2021/0174258 | A1 * | 6/2021 | Wenchel ............... | G06N 20/00 |
| 2021/0182730 | A1 * | 6/2021 | Clarke .................. | G06N 20/00 |
| 2022/0061746 | A1 * | 3/2022 | Lyman .................. | G16H 30/20 |
| 2022/0398490 | A1 * | 12/2022 | Han ...................... | G06N 20/00 |
| 2023/0008904 | A1 * | 1/2023 | Venkataraman ....... | G06N 20/00 |

OTHER PUBLICATIONS

Salem Alelyani, "Detection and Evaluation of Machine Learning Bias", Appl. Sci. 2021, 11(14), 6271, Published: Jul. 7, 2021.*

* cited by examiner

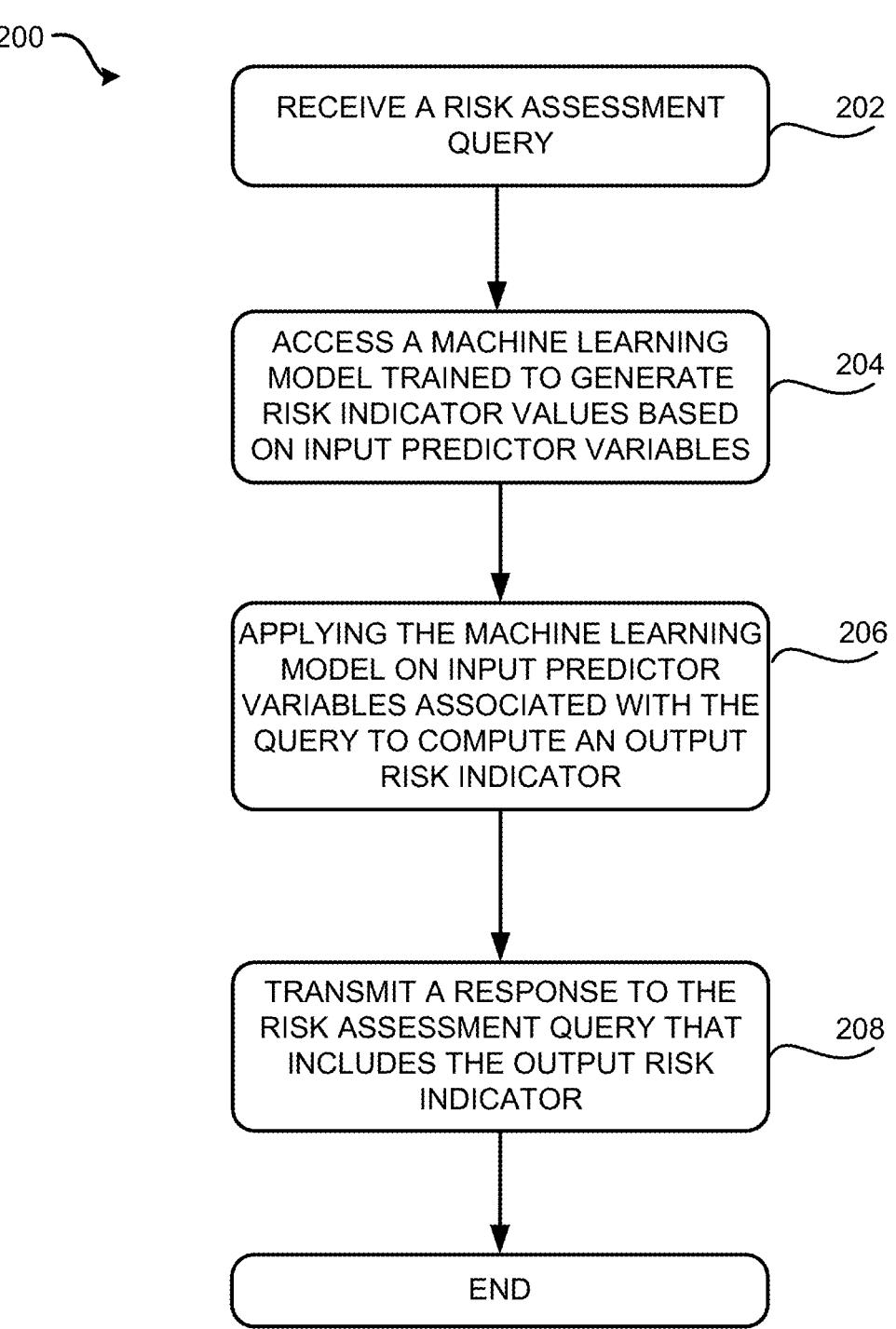

200

RECEIVE A RISK ASSESSMENT QUERY — 202

ACCESS A MACHINE LEARNING MODEL TRAINED TO GENERATE RISK INDICATOR VALUES BASED ON INPUT PREDICTOR VARIABLES — 204

APPLYING THE MACHINE LEARNING MODEL ON INPUT PREDICTOR VARIABLES ASSOCIATED WITH THE QUERY TO COMPUTE AN OUTPUT RISK INDICATOR — 206

TRANSMIT A RESPONSE TO THE RISK ASSESSMENT QUERY THAT INCLUDES THE OUTPUT RISK INDICATOR — 208

END

FIG. 2

BIAS DETECTION AND REDUCTION IN MACHINE-LEARNING TECHNIQUES

CROSS-REFERENCE TO RELATED APPLICATIONS

This claims priority to U.S. Provisional Application No. 63/262,616 filed on Oct. 15, 2021, which is hereby incorporated in its entirety by this reference.

TECHNICAL FIELD

The present disclosure relates generally to artificial intelligence. More specifically, but not by way of limitation, this disclosure relates to detecting and reducing bias in machine learning models that are trained for assessing risks or performing other operations.

BACKGROUND

Machine learning models can be used to perform one or more functions (e.g., acquiring, processing, analyzing, and understanding various inputs in order to produce an output that includes numerical or symbolic information). A machine learning model can be configured with a specific structure and trained to perform these functions. For example, a neural network model can include interconnected nodes that exchange data between one another. The nodes can have numeric weights that can be tuned during training. However, a machine learning model that is not adequately trained may introduce unintended bias in the model that can provide unfair predictions.

SUMMARY

Various aspects of the present disclosure provide systems and methods for detecting and reducing bias in machine learning models that are trained for risk assessment and outcome prediction. In one example, a method includes one or more processing devices performing operations. The operations comprise determining, using a machine learning model trained using a training process, a risk indicator for a target entity from predictor variables associated with the target entity, wherein the risk indicator indicates a level of risk associated with the target entity, wherein the training process includes operations comprising: training the machine learning model using training samples comprising training predictor variables and training outputs corresponding to the training predictor variables, obtaining data for a protected attribute; calculating a bias metrics using the data for the protected attribute and data obtained from the trained machine learning model; determining that a bias is detected based on the bias metric; modifying the machine learning model based on the detected bias; re-training the machine learning model; and transmitting, to a remote computing device, a responsive message including at least the risk indicator for use in controlling access of the target entity to one or more interactive computing environments.

In another example, a system comprises a processing device; and a memory device in which instructions executable by the processing device are stored for causing the processing device to perform operations comprising: determining, using a machine learning model trained using a training process, a risk indicator for a target entity from predictor variables associated with the target entity, wherein the risk indicator indicates a level of risk associated with the target entity, wherein the training process includes operations comprising: training the machine learning model using training samples comprising training predictor variables and training outputs corresponding to the training predictor variables, obtaining data for a protected attribute; calculating a bias metric using the data for the protected attribute and data obtained from the trained machine learning model; determining that a bias is detected based on the bias metric; modifying the machine learning model based on the detected bias; re-training the machine learning model; and transmitting, to a remote computing device, a responsive message including at least the risk indicator for use in controlling access of the target entity to one or more interactive computing environments.

In yet another example, a non-transitory computer-readable storage medium has program code that is executable by a processor device to cause a computing device to perform operations. The operations comprise: determining, using a machine learning model trained using a training process, a risk indicator for a target entity from predictor variables associated with the target entity, wherein the risk indicator indicates a level of risk associated with the target entity, wherein the training process includes operations comprising: training the machine learning model using training samples comprising training predictor variables and training outputs corresponding to the training predictor variables, obtaining data for a protected attribute; calculating a bias metric using the data for the protected attribute and data obtained from the trained machine learning model; determining that a bias is detected based on the bias metric; modifying the machine learning model based on the detected bias; re-training the machine learning model; and transmitting, to a remote computing device, a responsive message including at least the risk indicator for use in controlling access of the target entity to one or more interactive computing environments.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

The foregoing, together with other features and examples, will become more apparent upon referring to the following specification, claims, and accompanying drawings.

BRIEF DESCRIPTION OF THE DRAWINGS

FIG. 2 is a flow chart depicting an example of a process for utilizing a machine learning model to generate risk indicators for a target entity based on predictor variables associated with the target entity according to certain aspects of the present disclosure.

DETAILED DESCRIPTION

Figure 1:
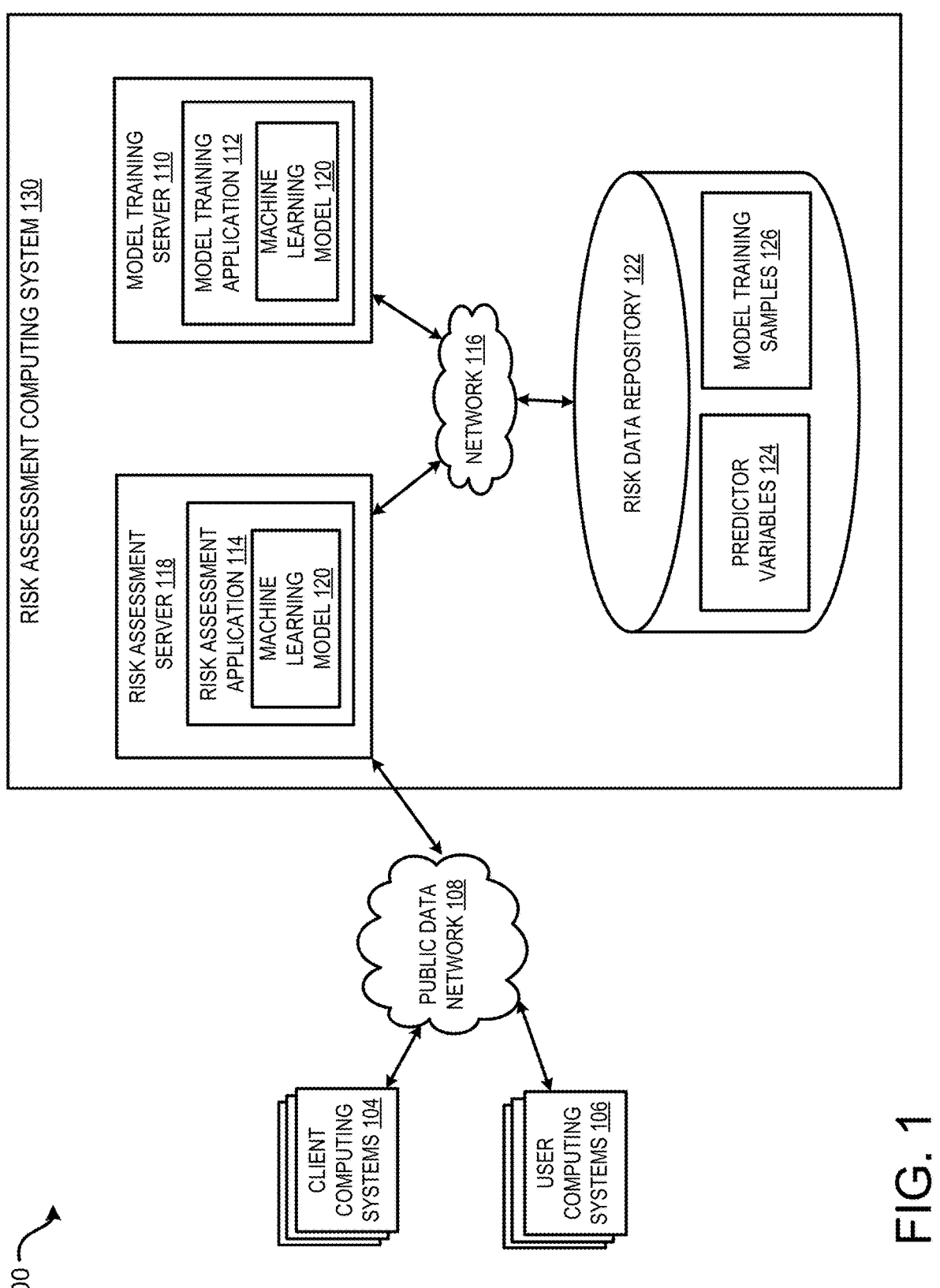
FIG. 1 is a block diagram depicting an example of a computing environment in which bias is detected and reduced for a machine learning model used in a risk assessment application according to certain aspects of the present disclosure.

Certain aspects are described herein for detecting and reducing bias in machine learning models that are trained for risk assessment and outcome prediction. The bias can be detected based on bias metrics calculated for a protected attribute. The machine learning model or data associated with it can be modified to remove or reduce the detected bias.

For example, a model training server can use training samples to train a machine learning model configured to determine a risk indicator for a target entity from predictor variables associated with the target entity. The training samples include training predictor variables and training outputs corresponding to the training predictor variables (e.g., the actual outcomes observed for the corresponding entities). The model training server can further obtain data for a protected attribute for which the bias is to be detected and reduced. For example, if the target entity is an individual, the protected attribute can be the age or the gender. If the target entity is a computing system or device, the protected attribute can be the operating system of the system or device, the type of the system or device (e.g., a server computer, a laptop, a smartphone, or a tablet), the location of the system or device (e.g., indicated by the IP address), and so on.

The data for the protected attribute can include the value of the protected attribute and the corresponding actual outcome. For example, if the predicted risk indicator indicates the risk of the target entity accessing an online computing environment, the actual outcome includes whether the target entity with a specific value of the protected attribute is granted access to the online computing environment or not. Depending on the type of the protected attribute, the data may be available or need to be generated. For example, if the data for the protected attribute (e.g., age, gender, the operating system, the system type) is available for individual entities, the attribute is an individual level attribute, and the data can be used in the bias detection. If the data for the protected attribute is not available for every entity (e.g., religion, the country of birth, ethnicity), a proxy for the protected attribute may be generated, such as a geographic level attribute, by using geographically aggregated information and applied to individual based on the predominant attribute values (e.g., religion, ethnicity) in a particular geography. The data for the protected attribute for individual entities can be estimated, such as based on census released data and mapped to individuals.

For the protected attribute, the model training sever can calculate one or more bias metrics using the data for the protected attribute and the data obtained from the trained machine learning model. In some examples, the bias metric can include a correlation metric. For example, the correlation metric can include a correlation between values of each training predictor variable and the data of the protected attribute. The correlation metric can further include a correlation between outputs of the machine learning model and the data of the protected attribute. If any of the correlations is higher than a bias threshold value, then the bias is detected. In this way, the bias in the predicted risk indicator as well as bias in the predictor variables can be detected. In further examples, the bias metric can include a calibrated log-odds difference (COD). The COD calculates the difference between the predicted outcomes and the actual outcomes of one group indicated by the protected attribute against others. If the COD is higher than a threshold value of COD, then the bias is detected, and the model is considered as biased towards the group of entities. Either the correlation metric or the COD or both can be used to detect the bias in the machine learning model.

To reduce or remove the bias, the model training sever can modify the machine learning model and the associated data based on the detected bias. For example, if the bias is detected in a predictor variable based on the correlation corresponding to the predictor variable being higher than the bias threshold, the predictor variable can be removed from the input predictor variables of the machine learning model. The structure of the model can be correspondingly adjusted, such as removing the input node for the predictor variable if the model is a neural network model.

In another example, the predictor variable that causes the bias can be redefined or adjusted. For example, the predictor variable causing the bias is the range of the number of new accounts opened by a user within a year, such as range 1 (0-1 account), range 2 (2-3 accounts), range 3 (4-6 accounts), and range 4 (above 6 accounts). Because younger users tend to open more new accounts than older users, this predictor variable can cause bias against the younger users which may be detected by the bias detection against the protected attribute of age. To reduce the bias, the last two ranges (range 3 and range 4) can be combined into one range (above 4 accounts). In this way, the predictor variable can be re-defined to be less correlated to the age of the user and thus less biased against the protected attribute of age. In other words, to reduce the bias, the predictor variable causing the bias can be modified or re-defined to be less correlated to the protected attribute. The structure and/or the training data of the machine learning model can also be modified accordingly. In the above example, the values of the predictor variable in the training data can be updated to reflect that the range 3 and range 4 are combined.

The model training sever can re-train the modified machine learning model and detect the bias in the re-trained model according to the above process. If there are more than one protected attribute, the above process can be repeated for each protected attribute. The trained machine learning model can be used to predict a risk indicator for a target entity from predictor variables associated with the target entity. The risk indicator can be used to control access of the target entity to one or more interactive computing environments.

Certain aspects described herein provide improvements to the machine learning techniques by detecting and reducing bias in the machine learning models. For instance, the machine learning model presented herein is trained and analyzed to detect bias based on bias metrics calculated for a protected attribute. This analysis allows the bias against the protected attribute in the machine learning model to be detected. The bias metrics used to detect the bias can identify the cause of the bias thereby facilitating the removal or reduction of the detected bias. As a result, the output machine learning model can provide fair and accurate risk predictions or other outcome predictions.

Additional or alternative aspects can implement or apply rules of a particular type that improve existing technological processes involving machine-learning techniques. For instance, to reduce the bias of the machine learning model, a particular set of rules are employed in the training of the machine learning model, such as rules for calculating the bias metric, rules for detecting the bias, and rules for reducing the bias and retraining the machine learning model. This particular set of rules allow the bias against a protected attribute to be detected and reduced during the training of the machine learning model.

Certain aspects described herein also provide improvements to users' access to the online computing environment by solving problems that are specific to online platforms.

These improvements include reducing the bias in the predictive model thereby avoiding making biased decisions when providing online resource access to users. Achieving fair decisions for online resource access is uniquely difficult because the decision on granting or denying access must be made within a short period of time, such as a couple of seconds or even shorter. The large number of users and the wide variety of the predictor variables considered when making the determinations add additional challenges to this task.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative examples but, like the illustrative examples, should not be used to limit the present disclosure.

Operating Environment Example for Machine-Learning Operations

Referring now to the drawings, FIG. 1 is a block diagram depicting an example of an operating environment 100 in which bias is detected and reduced for a machine learning model 120 used in a risk assessment application according to certain aspects of the present disclosure The machine learning model 120 can be utilized by a risk assessment computing system 130 to predict risk indicators based on predictor variables. FIG. 1 depicts examples of hardware components of the risk assessment computing system 130, according to some aspects. The risk assessment computing system 130 is a specialized computing system that may be used for processing large amounts of data using a large number of computer processing cycles. The risk assessment computing system 130 can include a model training server 110 for building and training a machine learning model 120, such as a neural network, for which the bias has been detected and reduced during the training. The risk assessment computing system 130 can further include a risk assessment server 118 for performing a risk assessment for given predictor variables 124 using the trained machine learning model 120.

The model training server 110 can include one or more processing devices that execute program code, such as a model training application 112. The program code is stored on a non-transitory computer-readable medium. The model training application 112 can execute one or more processes to train and optimize (including detecting and reducing bias for) a machine learning model 120 for predicting risk indicators based on predictor variables 124.

In some aspects, the model training application 112 can build and train a machine learning model 120 utilizing model training samples 126. The machine learning model 120 can be any suitable machine learning model such as a neural network, decisions tree, support vector machine, etc. The model training samples 126 can include multiple training vectors consisting of training predictor variables and training risk indicator outputs corresponding to the training vectors. The model training samples 126 can be stored in one or more network-attached storage units on which various repositories, databases, or other structures are stored. Examples of these data structures are the risk data repository 122.

Network-attached storage units may store a variety of different types of data organized in a variety of different ways and from a variety of different sources. For example, the network-attached storage unit may include storage other than primary storage located within the model training server 110 that is directly accessible by processors located therein. In some aspects, the network-attached storage unit may include secondary, tertiary, or auxiliary storage, such as large hard drives, servers, virtual memory, among other types. Storage devices may include portable or non-portable storage devices, optical storage devices, and various other mediums capable of storing and containing data. A machine-readable storage medium or computer-readable storage medium may include a non-transitory medium in which data can be stored and that does not include carrier waves or transitory electronic signals. Examples of a non-transitory medium may include, for example, a magnetic disk or tape, optical storage media such as a compact disk or digital versatile disk, flash memory, memory, or memory devices.

The risk assessment server 118 can include one or more processing devices that execute program code, such as a risk assessment application 114. The program code is stored on a non-transitory computer-readable medium. The risk assessment application 114 can execute one or more processes to utilize the machine learning model 120 trained by the model training application 112 to predict risk indicators based on input predictor variables 124.

Furthermore, the risk assessment computing system 130 can communicate with various other computing systems, such as client computing systems 104. For example, client computing systems 104 may send risk assessment queries to the risk assessment server 118 for risk assessment, or may send signals to the risk assessment server 118 that control or otherwise influence different aspects of the risk assessment computing system 130. The client computing systems 104 may also interact with user computing systems 106 via one or more public data networks 108 to facilitate interactions between users of the user computing systems 106 and interactive computing environments provided by the client computing systems 104.

Each client computing system 104 may include one or more third-party devices, such as individual servers or groups of servers operating in a distributed manner. A client computing system 104 can include any computing device or group of computing devices operated by a seller, lender, or other providers of products or services. The client computing system 104 can include one or more server devices. The one or more server devices can include or can otherwise access one or more non-transitory computer-readable media. The client computing system 104 can also execute instructions that provide an interactive computing environment accessible to user computing systems 106. Examples of the interactive computing environment include a mobile application specific to a particular client computing system 104, a web-based application accessible via a mobile device, etc. The executable instructions are stored in one or more non-transitory computer-readable media.

The client computing system 104 can further include one or more processing devices that are capable of providing the interactive computing environment to perform operations described herein. The interactive computing environment can include executable instructions stored in one or more non-transitory computer-readable media. The instructions providing the interactive computing environment can configure one or more processing devices to perform operations described herein. In some aspects, the executable instructions for the interactive computing environment can include instructions that provide one or more graphical interfaces. The graphical interfaces are used by a user computing system 106 to access various functions of the interactive computing environment. For instance, the interactive computing environment may transmit data to and receive data from a user computing system 106 to shift between different states of the interactive computing environment, where the different states allow one or more electronics transactions between the user computing system 106 and the client computing system 104 to be performed.

In some examples, a client computing system 104 may have other computing resources associated therewith (not shown in FIG. 1), such as server computers hosting and managing virtual machine instances for providing cloud computing services, server computers hosting and managing online storage resources for users, server computers for providing database services, and others. The interaction between the user computing system 106 and the client computing system 104 may be performed through graphical user interfaces presented by the client computing system 104 to the user computing system 106, or through an application programming interface (API) calls or web service calls.

A user computing system 106 can include any computing device or other communication device operated by a user, such as a consumer or a customer. The user computing system 106 can include one or more computing devices, such as laptops, smartphones, and other personal computing devices. A user computing system 106 can include executable instructions stored in one or more non-transitory computer-readable media. The user computing system 106 can also include one or more processing devices that are capable of executing program code to perform operations described herein. In various examples, the user computing system 106 can allow a user to access certain online services from a client computing system 104 or other computing resources, to engage in mobile commerce with a client computing system 104, to obtain controlled access to electronic content hosted by the client computing system 104, etc.

For instance, the user can use the user computing system 106 to engage in an electronic transaction with a client computing system 104 via an interactive computing environment. An electronic transaction between the user computing system 106 and the client computing system 104 can include, for example, the user computing system 106 being used to request online storage resources managed by the client computing system 104, acquire cloud computing resources (e.g., virtual machine instances), and so on. An electronic transaction between the user computing system 106 and the client computing system 104 can also include, for example, query a set of sensitive or other controlled data, access online financial services provided via the interactive computing environment, submit an online credit card application or other digital application to the client computing system 104 via the interactive computing environment, operating an electronic tool within an interactive computing environment hosted by the client computing system (e.g., a content-modification feature, an application-processing feature, etc.).

In some aspects, an interactive computing environment implemented through a client computing system 104 can be used to provide access to various online functions. As a simplified example, a website or other interactive computing environment provided by an online resource provider can include electronic functions for requesting computing resources, online storage resources, network resources, database resources, or other types of resources. In another example, a website or other interactive computing environment provided by a financial institution can include electronic functions for obtaining one or more financial services, such as loan application and management tools, credit card application and transaction management workflows, electronic fund transfers, etc. A user computing system 106 can be used to request access to the interactive computing environment provided by the client computing system 104, which can selectively grant or deny access to various electronic functions. Based on the request, the client computing system 104 can collect data associated with the user and communicate with the risk assessment server 118 for risk assessment. Based on the risk indicator predicted by the risk assessment server 118, the client computing system 104 can determine whether to grant the access request of the user computing system 106 to certain features of the interactive computing environment.

In a simplified example, the system depicted in FIG. 1 can configure a machine learning model 120 to be used both for accurately determining risk indicators, such as credit scores, using predictor variables. A predictor variable can be any variable predictive of risk that is associated with an entity. Any suitable predictor variable that is authorized for use by an appropriate legal or regulatory framework may be used.

Examples of predictor variables used for predicting the risk associated with an entity accessing online resources include, but are not limited to, variables indicating the demographic characteristics of the entity (e.g., name of the entity, the network or physical address of the company, the identification of the company, the revenue of the company), variables indicative of prior actions or transactions involving the entity (e.g., past requests of online resources submitted by the entity, the amount of online resource currently held by the entity, and so on.), variables indicative of one or more behavioral traits of an entity (e.g., the timeliness of the entity releasing the online resources), etc. Similarly, examples of predictor variables used for predicting the risk associated with an entity accessing services provided by a financial institute include, but are not limited to, indicative of one or more demographic characteristics of an entity (e.g., age, gender, income, etc.), variables indicative of prior actions or transactions involving the entity (e.g., information that can be obtained from credit files or records, financial records, consumer records, or other data about the activities or characteristics of the entity), variables indicative of one or more behavioral traits of an entity, etc.

The predicted risk indicator can be utilized by the service provider to determine the risk associated with the entity accessing a service provided by the service provider, thereby granting or denying access by the entity to an interactive computing environment implementing the service. For example, if the service provider determines that the predicted risk indicator is lower than a threshold risk indicator value, then the client computing system 104 associated with the service provider can generate or otherwise provide access permission to the user computing system 106 that requested the access. The access permission can include, for example, cryptographic keys used to generate valid access credentials or decryption keys used to decrypt access credentials. The client computing system 104 associated with the service provider can also allocate resources to the user and provide a dedicated web address for the allocated resources to the user computing system 106, for example, by adding it in the access permission. With the obtained access credentials and/or the dedicated web address, the user computing system 106 can establish a secure network connection to the computing environment hosted by the client computing system 104 and access the resources via invoking API calls, web service calls, HTTP requests, or other proper mechanisms.

Each communication within the operating environment 100 may occur over one or more data networks, such as a public data network 108, a network 116 such as a private data network, or some combination thereof. A data network may include one or more of a variety of different types of networks, including a wireless network, a wired network, or a combination of a wired and wireless network. Examples of suitable networks include the Internet, a personal area network, a local area network ("LAN"), a wide area network ("WAN"), or a wireless local area network ("WLAN"). A wireless network may include a wireless interface or a combination of wireless interfaces. A wired network may include a wired interface. The wired or wireless networks may be implemented using routers, access points, bridges, gateways, or the like, to connect devices in the data network.

The number of devices depicted in FIG. 1 is provided for illustrative purposes. Different numbers of devices may be used. For example, while certain devices or systems are shown as single devices in FIG. 1, multiple devices may instead be used to implement these devices or systems. Similarly, devices or systems that are shown as separate, such as the model training server 110 and the risk assessment server 118, may be instead implemented in a signal device or system.

Examples of Operations Involving Machine-Learning

FIG. 2 is a flow chart depicting an example of a process 200 for utilizing a machine learning model to generate risk indicators for a target entity based on predictor variables associated with the target entity. One or more computing devices (e.g., the risk assessment server 118) implement operations depicted in FIG. 2 by executing suitable program code (e.g., the risk assessment application 114). For illustrative purposes, the process 200 is described with reference to certain examples depicted in the figures. Other implementations, however, are possible.

At block 202, the process 200 involves receiving a risk assessment query for a target entity from a remote computing device, such as a computing device associated with the target entity requesting the risk assessment. The risk assessment query can also be received by the risk assessment server 118 from a remote computing device associated with an entity authorized to request risk assessment of the target entity.

At block 204, the process 200 involves accessing a machine learning model trained to generate risk indicator values based on input predictor variables or other data suitable for assessing risks associated with an entity. Examples of predictor variables can include data associated with an entity that describes prior actions or transactions involving the entity (e.g., information that can be obtained from credit files or records, financial records, consumer records, or other data about the activities or characteristics of the entity), behavioral traits of the entity, demographic traits of the entity, or any other traits that may be used to predict risks associated with the entity. In some aspects, predictor variables can be obtained from credit files, financial records, consumer records, etc. The risk indicator can indicate a level of risk associated with the entity, such as a credit score of the entity.

The machine learning model can be constructed and trained based on training samples including training predictor variables and training risk indicator outputs. The training of the machine learning model can include bias detection and reduction to reduce bias in the machine learning model and the risk indicator outputs. Additional details regarding training the machine learning model will be presented below with regard to FIG. 3.

At block 206, the process 200 involves applying the machine learning model to generate a risk indicator for the target entity specified in the risk assessment query. Predictor variables associated with the target entity can be used as inputs to the machine learning model. The predictor variables associated with the target entity can be obtained from a predictor variable database configured to store predictor variables associated with various entities. The output of the machine learning model would include the risk indicator for the target entity based on its current predictor variables.

At block 208, the process 200 involves generating and transmitting a response to the risk assessment query. The response can include the risk indicator generated using the machine learning model. The risk indicator can be used for one or more operations that involve performing an operation with respect to the target entity based on a predicted risk associated with the target entity. In one example, the risk indicator can be utilized to control access to one or more interactive computing environments by the target entity.

As discussed above with regard to FIG. 1, the risk assessment computing system 130 can communicate with client computing systems 104, which may send risk assessment queries to the risk assessment server 118 to request risk assessment. The client computing systems 104 may be associated with technological providers, such as cloud computing providers, online storage providers, or financial institutions such as banks, credit unions, credit-card companies, insurance companies, or other types of organizations. The client computing systems 104 may be implemented to provide interactive computing environments for customers to access various services offered by these service providers. Customers can utilize user computing systems 106 to access the interactive computing environments thereby accessing the services provided by these providers.

For example, a customer can submit a request to access the interactive computing environment using a user computing system 106. Based on the request, the client computing system 104 can generate and submit a risk assessment query for the customer to the risk assessment server 118. The risk assessment query can include, for example, an identity of the customer and other information associated with the customer that can be utilized to generate predictor variables. The risk assessment server 118 can perform a risk assessment based on predictor variables generated for the customer and return the predicted risk indicator to the client computing system 104.

Based on the received risk indicator, the client computing system 104 can determine whether to grant the customer access to the interactive computing environment. If the client computing system 104 determines that the level of risk associated with the customer accessing the interactive computing environment and the associated technical or financial service is too high, the client computing system 104 can deny access by the customer to the interactive computing environment. Conversely, if the client computing system 104 determines that the level of risk associated with the customer is acceptable, the client computing system 104 can grant access to the interactive computing environment by the customer and the customer would be able to utilize the various services provided by the service providers. For example, with the granted access, the customer can utilize the user computing system 106 to access clouding computing resources, online storage resources, web pages or other user interfaces provided by the client computing system 104 to execute applications, store data, query data, submit an online digital application, operate electronic tools, or perform various other operations within the interactive computing environment hosted by the client computing system 104.

Figure 3:
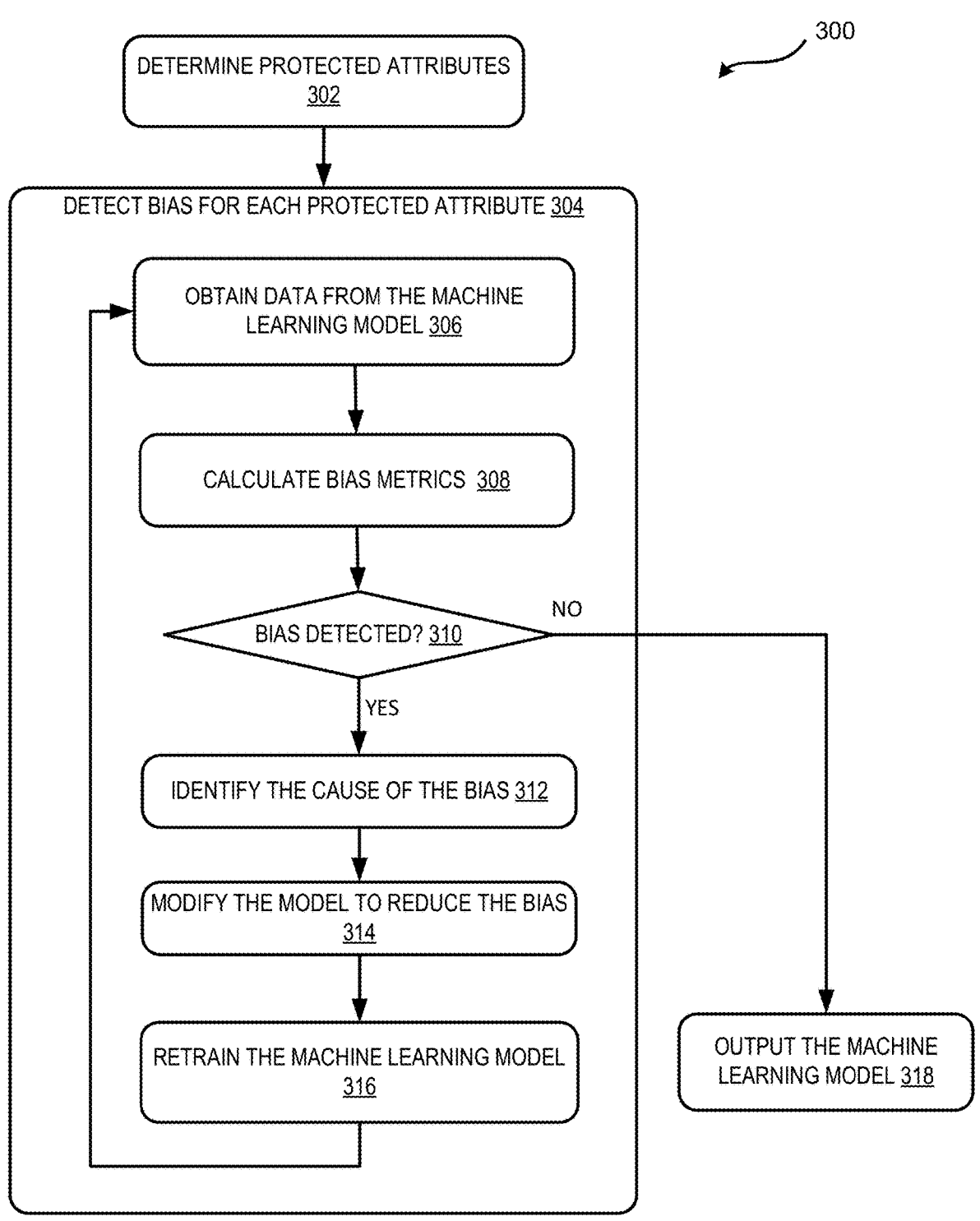
FIG. 3 is a flow chart depicting an example of a process for detecting and reducing bias in a machine learning model according to certain aspects of the present disclosure.

Referring now to FIG. 3, a flow chart depicting an example of a process 300 for detecting and reducing bias in a machine learning model is presented. The process 300 is applied to a machine learning that has been initially trained without considering the bias. One or more computing devices (e.g., the model training server 110) implement operations depicted in FIG. 3 by executing suitable program code (e.g., the model training application 112). For illustrative purposes, the process 300 is described with reference to certain examples depicted in the figures. Other implementations, however, are possible.

At block 302, the process 300 involves the model training server 110 determining protected attributes. The protected attributes can be associated with a target entity for which the machine learning model 120 is used to determine a risk indicator. The protected attributes are attributes associated with an entity that cannot be discriminated against by the machine learning model 120. In some examples, the target entity can be an individual. The protected attributes of an individual can be attributes unauthorized for use by legal or regulatory framework, deemed unnecessary for the prediction of the risk indicator, etc. Thus, it may be necessary to detect and reduce bias in the machine learning model 120 related to the protected attributes. Examples of the protected attributes associated with the individual can include, but are not limited to, an age, a gender, an ethnicity, a religion, or another suitable characteristic associated with the individual.

Additionally, or alternatively, the target entity can be a computing system or device. The protected attributes of a computing system or device can be any attributes that cannot be discriminated against by the machine learning model according to rules or policies, such as a service level agreement. Examples of the protected attributes of a computing system or a device include, but are not limited to, an operating system of the computing system or device, the type of the system or device (e.g., a server computer, a laptop, a smartphone, or a tablet), the location of the system or device (e.g., indicated by the IP address), or another suitable attribute associated with the computing system or device.

Depending on the type of the protected attribute, the data for the protected attribute may be available, obtainable from $3^{rd}$ party organizations that have permission to share, or need to be generated. For example, if the data for the protected attribute (e.g., age, gender, operating system, system type) is available for each entity, the protected attribute is an individual level attribute, and the available data can be used in bias detection. In other examples, the data for the protected attribute may not be available. For example, data relating to the individual's religion, the country of birth, ethnicity, etc. may be unavailable. The protected attributes associated with unavailable data at the individual level may be estimated using an aggregated view at a geography level as provided by, for example, Census as a proxy. This proxy attribute is referred to herein as a geographic level attribute. The data for the geographical level attributes can be estimated, such as based on census released data and mapped to individuals. Therefore, protected attributes can be any attribute of an individual, computer system, or the like for which data can be obtained or generated and for which bias can be detected and reduced.

At block 304, the process 300 involves the model training server 110 detecting bias for each protected attribute. To detect bias for each protected attribute, the model training server 110 may use data for each protected attribute and data obtained from the machine learning model 120. The data for each protected attribute can include a value for the protected attribute and a corresponding actual outcome. For example, the risk indicator predicted by the machine learning model 120 can indicate the risk of the target entity accessing an online computing environment. The corresponding actual outcome can be whether the target entity with a specific value for a particular protected attribute was granted access to the online computing environment. The bias can be detected in the data obtained from the machine learning model 120 for any suitable protected attribute if the data for the protected attributes, including the corresponding actual outcomes, can be obtained or generated.

In an example, the protected attribute can be gender and the data associated with gender can include the gender of each individual in the data and an indication of access granted or access not granted for each individual in the data. Additionally, the protected attribute can be a type of operating system associated with computing systems, and the data can include, for each computing system, the type of operating system and the indication of access granted or not granted. In another example, the protected attribute can be age and the corresponding actual outcome can be a whether the individual was approved for a loan. Thus, the data for the protected attribute can include the age of the individual and an indication of approved or not approved for the individual. Additionally, the data may be generated for, for example, the geographical level attributes. In an example, the protected attribute can be religion and the corresponding actual outcome can be credit score. The data for religion can be estimated by comparing census data and obtainable data, such as addresses for individuals. Therefore, the data for religion can include estimated religions for each individual and an indicator of good credit or bad credit for each induvial. The indication of good credit or bad credit may be based on a threshold such that a credit score above the threshold may be considered good and a credit score below the threshold may be considered bad.

At block 306, the process 300 involves the model training server 110 obtaining data from the machine learning model 120. The machine learning model 120 can be configured to generate a prediction for the risk indicator, such as a risk level associated with granting the target entity access to the online computing environment, a risk level associated with granting the target entity a loan, or other suitable predictions associated with the target entity. Thus, the data obtained from the machine learning model 120 can be a predicted outcome based on the input predictor variables. The obtained data can further include the corresponding actual outcome.

In an example, the machine learning model 120 can be a neural network. The neural network can include an input layer, an output layer, and one or more hidden layers. Each layer contains one or more nodes. Each of the input nodes in the input layer is configured to take values from input data. In some examples, the input data can be data associated with a predictor variable 124. Training of the neural network model can involve adjusting parameters of the neural network based on the data for the predictor variables 124 and corresponding actual outcomes provided to the neural network as risk indicator labels. The adjustable parameters of the neural network can include weights for the connections among the nodes in different layers, the number of nodes in a layer of the network, the number of layers in the network, and so on. The parameters can be adjusted to optimize a loss function determined based on the risk indicators generated by the neural network from the data and risk indicator labels of the training predictor variables 124. The risk indicators predicted by the trained neural network can be used as the predicted outcome for bias detection and removal.

At block 308, the process 300 involves the model training server 110 calculating bias metrics. Bias metrics can be calculated using the data for the protected attribute and the data obtained from the trained machine learning model 120. Various metrics can be used for determining bias such as accuracy difference, predicted and actual log odds, variation, true positive rate, true negative rate, false positive rate, false negative rate, correlation, calibrated log odds, etc.

In some examples, the bias metrics can include a correlation metric. For example, the correlation metric can include a correlation between values of the predictor variables 124 and the data of the protected attribute. The correlation metric can further include a correlation between outputs of the machine learning model (e.g., the predicted outcome) and the data of the protected attribute. In a simplified example, the protected attribute can be the gender attribute of a user including female and male. The predictor variables 124 can include the number of new accounts opened in the past 12 months by a user and the total balance of the user. In this example, a first correlation metric can be calculated between a vector containing the gender attribute values for a group of users and a vector containing the number of new accounts for the corresponding users in the group. Likewise, a second correlation metric can be calculated between the vector of gender attribute and another vector containing the total balances of the group of users. Additionally, a third correlation metric can be calculated between the vector of gender attribute and the predicted risk indicator by the machine learning model 120 based on the two predictor variables.

Additionally, or alternatively, the bias metrics can include a calibrated log-odds difference (COD). The COD calculates a difference between the predicted outcomes and the actual outcomes of a particular group indicated by the protected attribute against other groups. For example, the particular group can be an age group of those ages twenty to thirty and the other groups can be any other age group. The predicted outcomes can be outcome determined by the machine learning model 120, such as a predicted likelihood of default on a loan. The actual outcomes can be obtained from the corresponding actual result, such as the actual default status on the loan. In another example, the predicted outcome can be the prediction of whether a user computer system 106 will be granted access to a client computing system 104 and the actual corresponding outcome can be whether the user computer system 106 was granted access to the client computing system 104. The corresponding actual outcomes can be determined from historical data related to the risk indicator or otherwise obtained. An equation for calculating COD can take the form:

COD=[(Predicted log odds for a group−Actual log
    Odds for the group)−(Predicted log odds for
    others−Actual log odds for others)]     (1)

By subtracting actual odds from the predicted odds, an error of the machine learning model 120 can be determined. Additionally, by subtracting an error associated with the other groups from an error associated with the particular group, a bias towards the particular group can be determined. In some examples, the COD is calculated for each of the protected attributes.

At block 310, the process 300 involves the model training server 110 determining whether a bias is detected. Either the correlation metric or the COD or both can be used to detect the bias in the machine learning model. For example, if any of the correlations is higher than a bias threshold value, then the bias is detected. For example, the bias threshold can be 0.3. Thus, if the first correlation, the second correlation, the third correlation, or a combination thereof, as described above, is above 0.3, bias may be detected. In this way, the bias in the predicted risk indicator as well as bias in the predictor variables can be detected.

Additionally, if the COD is higher than a threshold value of COD, then the bias can be detected, and the machine learning model 120 is considered biased towards the particular group. For example, the particular group can be female. If a COD for subtracting an error for other genders from an error for females is above the threshold, the machine learning model 120 may be biased towards females. The COD may further be calculated using a score equation that can provide a risk score (e.g., credit score) based on the prediction. In other words, the predicted odds, actual odds, or both can be applied in the score equation to obtain the risk score. Thus, a risk score for the other groups can be subtracted from a risk score for the particular group. A score of 32 can be set as the threshold value of COD. For example, training samples for the machine learning model are collected retrospectively and each entity is attached an outcome of good or bad based on observed data shared by a third-party organization (e.g., credit providers). The bad outcome can indicate failing to meet credit obligation (e.g., payment default). The good outcome can indicate that the credit obligation is met. Actual observed good-bad odds (GBO) for the entity can be calculated based on the training samples by protected groups as follows:

Actual GBO=(Number of Goods/Number of Bads)
    and

Actual ln (GBO)=ln(Number of Goods/Number of
    Bads), where, ln is the natural logarithm.

The machine learning model can be configured to predict the probability of the target entity having a bad outcome in the future. That is, $$\text{model output} = \text{Estimated probability of bad } P(B)$$

$$P(B) = \frac{Bad}{Good + Bad}$$

$$GBO = \frac{Good}{Bad}$$

$$GBO = \frac{1 - P(B)}{P(B)}$$

$$\text{Predicted } \ln(GBO) = \ln\left(\frac{1 - P(B)}{P(B)}\right)$$

Further, $$\text{Predicted Calibrated Log Odds} =$$

$$\text{Risk Score} = [\text{Predicted } \ln(GBO) \times 144 + 200]$$

$$\text{Actual Calibrated Log Odds} = [\text{Actual } \ln (GBO) \times 144 + 200]$$

This leads to:

COD=Calibrated Log Odds Diff between Predicted
    and Actual Outcomes(Model Estimation
    error)=Predicted Calibrated Log Odds(Risk
    Score)−Actual Calibrated Log Odds If a bias is detected at block 310, at block 312, the process 300 involves the model training server 110 identifying the cause of the bias. For example, if a correlation for a specific predictor variable 124 is higher than the threshold value of correlation, the predictor variable 124 can be identified as the cause of the bias. Additionally, if a correlation for the predicted outcome, such as the risk indicator, of the machine learning model 120 is higher than the threshold value of correlation, the training process of the machine learning model 120, the structure of the machine learning model 120, or another suitable aspect of the machine learning model 120 may be identified as the cause of the bias. Additionally, the cause of the bias can be identified in the model training samples 126. For example, the model training samples 126 may be analyzed against the protected attribute to determine if each group of the protected attribute is sufficiently represented by the training samples 126. If a bias against a particular group is detected, the particular group may not be represented in a significant portion of the model training samples 126 and thus may not be adequately accounted for by the machine learning model causing bias toward the particular group.

At block 314, the process 300 involves the model training server 110 modifying the model to reduce the bias. For example, if the bias is detected in a predictor variable based on the correlation corresponding to the predictor variable being higher than the bias threshold, the predictor variable can be removed from the input predictor variables of the machine learning model. The structure of the model can be correspondingly adjusted, such as removing the input node for the predictor variable if the model is a neural network model.

In another example, the predictor variable 124 that causes the bias can be redefined or adjusted. For example, the predictor variable 124 causing the bias is the range of the number of new accounts opened by a user within a year, such as range 1 (0-1 account), range 2 (2-3 accounts), range 3 (4-6 accounts), and range 4 (above 6 accounts). Because younger users tend to open more new accounts than older users, this predictor variable can cause bias against the younger users which may be detected by the bias detection against the protected attribute of age. To reduce the bias, the last two ranges (range 3 and range 4) can be combined into one range (above 4 accounts). In this way, the predictor variable 124 can be re-defined to be less correlated to the age of the user and thus less biased against the protected attribute of age. In other words, to reduce the bias, the predictor variable 124 causing the bias can be modified or re-defined to be less correlated to the protected attribute.

The structure and/or the model training samples 126 of the machine learning model 120 can also be modified accordingly. In the above example, the values of the predictor variable in the model training samples 126 can be updated to reflect that the range 3 and range 4 are combined. Additionally, weights of the model training samples 126 can be adjusted to increase the weights of the protected groups that have higher estimation error as indicated by the COD. For example, a COD for a young age group may be above the threshold values of COD, indicating that the machine learning model 120 may be bias towards the young age group. Thus, model training samples 126 corresponding to the young age group can be provided higher weights for training the machine learning model to reduce the bias towards the young age group. In another example, the model training samples 126 can be modified to include more samples corresponding to the young age group to further reduce the bias towards the young age group. Thus, the model training samples 126, the structure of the machine learning model 120, the predictor variables of the machine learning model 120, other suitable aspects of the machine learning model 120, or a combination thereof can be modified to reduce bias of the machine learning model 120.

At block 316, the process 300 involves the model training server 110 retraining the machine learning model 120. Retraining of the machine learning model 120 can include modified predictor variables 124, modified model training samples 126, or both. Additionally, the machine learning model 120 used for retraining may include modifications to its structure (e.g., in a neural network structure modifications can be a change in a number of hidden layers, nodes, etc.). In some examples, blocks 306-316 can be repeated until the bias is no longer detected. Alternatively, or additionally, blocks 306-316 can be repeated for each protected attribute for a pre-determined number of iterations to generate a machine learning model 120 with reduced bias for a variety of protected attributes.

Additionally, to reduce the bias of the machine learning model, a new or modified set of rules can be employed in the training of the machine learning model, such as rules for calculating the bias metric, rules for detecting the bias, and rules for reducing the bias and retraining the machine learning model. The new or modified set of rules may allow the bias against a protected attribute to be detected and reduced during the training of the machine learning model.

At block 318, the process 300 involves the model training server 110 outputting the machine learning model 120. The machine learning model 120 may be output and used by the risk assessment computing system 130 to perform the risk assessment and outcome prediction as discussed above with respect to FIGS. 1 and 2.

While the above description focuses on detecting and correcting the bias in a machine learning model, the same technique can be applied to any model with a probability estimated that can be measured against a protected attribute to test for bias.

Example of Computing System for Machine-Learning Operations

Figure 4:
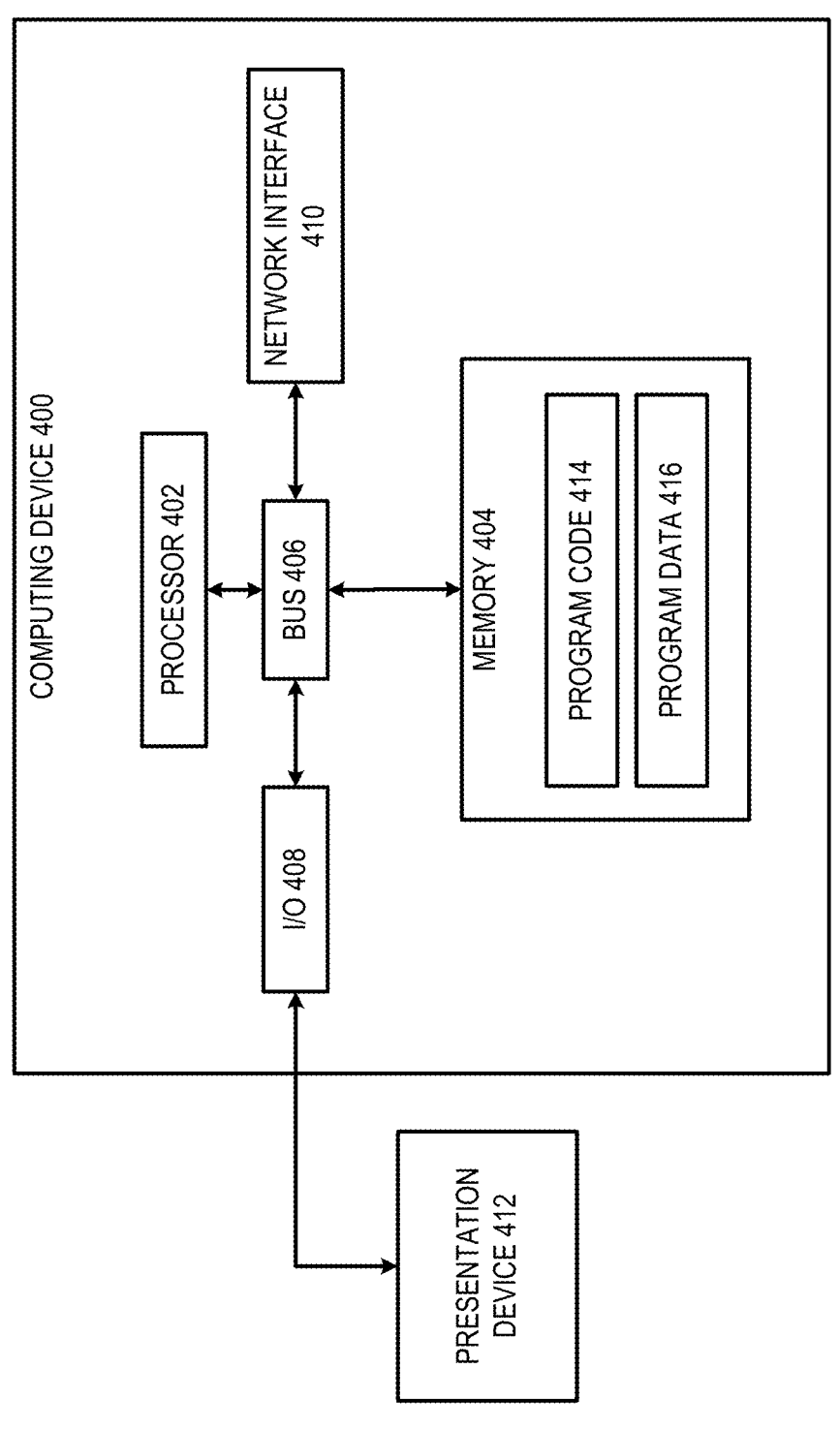
FIG. 4 is a block diagram depicting an example of a computing system suitable for implementing aspects of the techniques and technologies presented herein.

Any suitable computing system or group of computing systems can be used to perform the operations for the machine-learning operations described herein. For example, FIG. 4 is a block diagram depicting an example of a computing device 400, which can be used to implement the risk assessment server 118 or the model training server 110. The computing device 400 can include various devices for communicating with other devices in the operating environment 100, as described with respect to FIG. 1. The computing device 400 can include various devices for performing one or more transformation operations described above with respect to FIGS. 1-3.

The computing device 400 can include a processor 402 that is communicatively coupled to a memory 404. The processor 402 executes computer-executable program code stored in the memory 404, accesses information stored in the memory 404, or both. Program code may include machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc. may be passed, forwarded, or transmitted via any suitable means including memory sharing, message passing, token passing, network transmission, among others.

Examples of a processor 402 include a microprocessor, an application-specific integrated circuit, a field-programmable gate array, or any other suitable processing device. The processor 402 can include any number of processing devices, including one. The processor 402 can include or communicate with a memory 404. The memory 404 stores program code that, when executed by the processor 402, causes the processor to perform the operations described in this disclosure.

The memory 404 can include any suitable non-transitory computer-readable medium. The computer-readable medium can include any electronic, optical, magnetic, or other storage device capable of providing a processor with computer-readable program code or other program code. Non-limiting examples of a computer-readable medium include a magnetic disk, memory chip, optical storage, flash memory, storage class memory, ROM, RAM, an ASIC, magnetic storage, or any other medium from which a computer processor can read and execute program code. The program code may include processor-specific program code generated by a compiler or an interpreter from code written in any suitable computer-programming language. Examples of suitable programming language include Hadoop, C, C++, C#, Visual Basic, Java, Python, Perl, JavaScript, ActionScript, etc.

The computing device 400 may also include a number of external or internal devices such as input or output devices. For example, the computing device 400 is shown with an input/output interface 408 that can receive input from input devices or provide output to output devices. A bus 406 can also be included in the computing device 400. The bus 406 can communicatively couple one or more components of the computing device 400.

The computing device 400 can execute program code 414 that includes the risk assessment application 114 and/or the model training application 112. The program code 414 for the risk assessment application 114 and/or the model training application 112 may be resident in any suitable computer-readable medium and may be executed on any suitable processing device. For example, as depicted in FIG. 4, the program code 414 for the risk assessment application 114 and/or the model training application 112 can reside in the memory 404 at the computing device 400 along with the program data 416 associated with the program code 414, such as the predictor variables 124 and/or the model training samples 126. Executing the risk assessment application 114 or the model training application 112 can configure the processor 402 to perform the operations described herein.

In some aspects, the computing device 400 can include one or more output devices. One example of an output device is the network interface device 410 depicted in FIG. 4. A network interface device 410 can include any device or group of devices suitable for establishing a wired or wireless data connection to one or more data networks described herein. Non-limiting examples of the network interface device 410 include an Ethernet network adapter, a modem, etc.

Another example of an output device is the presentation device 412 depicted in FIG. 4. A presentation device 412 can include any device or group of devices suitable for providing visual, auditory, or other suitable sensory output. Non-limiting examples of the presentation device 412 include a touchscreen, a monitor, a speaker, a separate mobile computing device, etc. In some aspects, the presentation device

412 can include a remote client-computing device that communicates with the computing device 400 using one or more data networks described herein. In other aspects, the presentation device 412 can be omitted.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

The invention claimed is:

1. A method that includes one or more processing devices performing operations comprising:

determining, using a machine learning model trained using a training process, a risk indicator for a target entity from predictor variables associated with the target entity, wherein the risk indicator indicates a level of risk associated with the target entity, wherein the training process includes operations comprising:

training the machine learning model using training samples comprising training predictor variables and training outputs corresponding to the training predictor variables, obtaining a first data set for a first subgroup defining a protected attribute;

obtaining a second data set for a second subgroup different from the first subgroup;

calculating a bias metric using the first data set, the second data set, and predicted data obtained from the trained machine learning model, wherein the bias metric comprises a calibrated log-odds difference representing a difference between a first comparison of the first data set to the predicted data and a second comparison of the second data set to the predicted data;

determining that a bias is detected based on the bias metric;

modifying the machine learning model based on the detected bias;

re-training the machine learning model; and transmitting, to a remote computing device, a responsive message including at least the risk indicator for use in controlling access of the target entity to one or more interactive computing environments.

2. The method of claim 1, wherein the protected attribute is one of an individual level protected attribute or a geographic level protected attribute and obtaining data for the protected attribute comprises estimating the data for the geographic level protected attribute based on census released data and mapping to individuals.

3. The method of claim 1, wherein the second subgroup complements the first subgroup such that combining the first subgroup with the second subgroup represents a full group representative of the protected attribute.

4. The method of claim 3, wherein determining that a bias is detected based on the bias metric comprises determining that an absolute value of the bias metric is higher than a threshold value for the calibrated log-odds difference.

5. The method of claim 1, wherein the bias metric comprises a correlation metric that comprises a first correlation between values of a training predictor variable and the data of the protected attribute and a second correlation between outputs of the machine learning model and the data of the protected attribute.

6. The method of claim 5, wherein determining that a bias is detected based on the bias metric comprises determining that at least one of the first correlation and the second correlation is higher than a threshold value for the correlation.

7. The method of claim 1, wherein modifying the machine learning model based on the detected bias comprises one or more of:

removing a predictor variable for which the bias metric indicates a bias;

re-defining a predictor variable for which the bias metric indicates a bias; or modifying the training samples based on the detected bias.

8. A system comprising:

a processing device; and a memory device in which instructions executable by the processing device are stored for causing the processing device to perform operations comprising:

determining, using a machine learning model trained using a training process, a risk indicator for a target entity from predictor variables associated with the target entity, wherein the risk indicator indicates a level of risk associated with the target entity, wherein the training process includes operations comprising:

training the machine learning model using training samples comprising training predictor variables and training outputs corresponding to the training predictor variables, obtaining a first data set for a first subgroup defined by a protected attribute;

obtaining a second data set for a second subgroup different from the first subgroup;

calculating a bias metric using the first data set and the second data set and predicted data obtained from the trained machine learning model, wherein the bias metric comprises a calibrated log-odds difference representing a difference between a first comparison of the first data set compared to the predicted data and a second comparison of the second data set compared to the predicted data;

determining that a bias is detected based on the bias metric;

modifying the machine learning model based on the detected bias;

re-training the machine learning model; and transmitting, to a remote computing device, a responsive message including at least the risk indicator for use in controlling access of the target entity to one or more interactive computing environments.

9. The system of claim 8, wherein the protected attribute is one of an individual level protected attribute or a geographic level protected attribute and obtaining data for the protected attribute comprises estimating the data for the geographic level protected attribute based on census released data and mapping to individuals.

10. The system of claim 8, wherein the second subgroup complements the first subgroup such that combining the first subgroup with the second subgroup represents a full group representative of the protected attribute.

11. The system of claim 10, wherein the operation of determining that a bias is detected based on the bias metric comprises determining that an absolute value of the bias metric is higher than a threshold value for the calibrated log-odds difference.

12. The system of claim 8, wherein the bias metric comprises a correlation metric that comprises a first correlation between values of a training predictor variable and the data of the protected attribute and a second correlation between outputs of the machine learning model and the data of the protected attribute.

13. The system of claim 12, wherein the operation of determining that a bias is detected based on the bias metric comprises determining that at least one of the first correlation and the second correlation is higher than a threshold value for the correlation.

14. The system of claim 8, wherein the operation of modifying the machine learning model based on the detected bias comprises one or more of:

removing a predictor variable for which the bias metric indicates a bias;

re-defining a predictor variable for which the bias metric indicates a bias; or modifying the training samples based on the detected bias.

15. A non-transitory computer-readable storage medium having program code that is executable by a processor device to cause a computing device to perform operations, the operations comprising:

determining, using a machine learning model trained using a training process, a risk indicator for a target entity from predictor variables associated with the target entity, wherein the risk indicator indicates a level of risk associated with the target entity, wherein the training process includes operations comprising:

training the machine learning model using training samples comprising training predictor variables and training outputs corresponding to the training predictor variables, obtaining a first data set for a first subgroup defined by a protected attribute;

obtaining a second data set for a second subgroup different from the first subgroup;

calculating a bias metric using the first data set and the second data set and predicted data obtained from the trained machine learning model, wherein the bias metric comprises a calibrated log-odds difference representing a difference between a first comparison of the first data set compared to the predicted data and a second comparison of the second data set compared to the predicted data;

determining that a bias is detected based on the bias metric;

modifying the machine learning model based on the detected bias;

re-training the machine learning model; and transmitting, to a remote computing device, a responsive message including at least the risk indicator for use in controlling access of the target entity to one or more interactive computing environments.

16. The non-transitory computer-readable storage medium of claim 15, wherein the second subgroup complements the first subgroup such that combining the first subgroup with the second subgroup represents a full group representative of the protected attribute.

17. The non-transitory computer-readable storage medium of claim 16, wherein the operation of determining that a bias is detected based on the bias metric comprises determining that an absolute value of the bias metric is higher than a threshold value for the calibrated log-odds difference.

18. The non-transitory computer-readable storage medium of claim 15, wherein the bias metric comprises a correlation metric that comprises a first correlation between values of a training predictor variable and the data of the protected attribute and a second correlation between outputs of the machine learning model and the data of the protected attribute.

19. The non-transitory computer-readable storage medium of claim 18, wherein the operation of determining that a bias is detected based on the bias metric comprises determining that at least one of the first correlation and the second correlation is higher than a threshold value for the correlation.

20. The non-transitory computer-readable storage medium of claim 15, wherein the operation of modifying the machine learning model based on the detected bias comprises one or more of:

removing a predictor variable for which the bias metric indicates a bias;

re-defining a predictor variable for which the bias metric indicates a bias; or modifying the training samples based on the detected bias.

* * * * *